United States Patent
Okamoto

(10) Patent No.: US 10,362,102 B2
(45) Date of Patent: Jul. 23, 2019

(54) INFORMATION PROCESSING APPARATUS FOR ANALYZING NETWORK TYPE DATA

(71) Applicant: FUJI XEROX CO., LTD., Tokyo (JP)

(72) Inventor: Hiroshi Okamoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 360 days.

(21) Appl. No.: 14/947,232

(22) Filed: Nov. 20, 2015

(65) Prior Publication Data

US 2016/0359966 A1 Dec. 8, 2016

(30) Foreign Application Priority Data

Jun. 5, 2015 (JP) ................................ 2015-114781

(51) Int. Cl.
*H04W 4/21* (2018.01)
*H04L 12/24* (2006.01)
(Continued)

(52) U.S. Cl.
CPC ...... *H04L 67/1044* (2013.01); *H04L 41/0803* (2013.01); *H04W 4/21* (2018.02);
(Continued)

(58) Field of Classification Search
CPC . G06F 17/30598–30601; G06F 16/285; G06F 16/35–358; G06Q 50/01; H04L 41/12; H04L 41/142; H04L 43/04
See application file for complete search history.

(56) References Cited

U.S. PATENT DOCUMENTS 9,225,730 B1 * 12/2015 Brezinski ................ G06F 21/00
9,286,391 B1 * 3/2016 Dykstra ............ G06F 17/30864
(Continued)

FOREIGN PATENT DOCUMENTS

JP 2005-244647 A 9/2005
JP 2007-102657 A 4/2007
(Continued)

OTHER PUBLICATIONS

Aynaud, Thomas, and Jean-Loup Guillaume. "Static community detection algorithms for evolving networks." Modeling and optimization in mobile, ad hoc and wireless networks (WiOpt), 2010 proceedings of the 8th international symposium on. IEEE, 2010.*
(Continued)

*Primary Examiner* — David R Lazaro
(74) *Attorney, Agent, or Firm* — Oliff PLC

(57) ABSTRACT

An information processing apparatus includes a first network information acquisition unit that acquires first network information including plural event nodes and event links each connecting one pair of event nodes involved in an event, among the plural event nodes, a second network information acquisition unit that acquires second network information including at least two time links each connecting the plural event nodes and plural time nodes, and the one pair of event nodes and the time nodes indicating a time of occurrence of the event, and a second community generation unit that generates one or more second communities to which the plural event nodes and the plural time nodes belong, for the second network information.

6 Claims, 8 Drawing Sheets

(51) Int. Cl.
*H04L 29/08* (2006.01)
*G06Q 50/00* (2012.01)
(52) U.S. Cl.
CPC .............. *G06Q 50/01* (2013.01); *H04L 41/12* (2013.01); *H04L 41/142* (2013.01)

(56) References Cited

U.S. PATENT DOCUMENTS

| | | | |
|---|---|---|---|
| 9,607,075 B2* | 3/2017 | Tee | G06F 17/30598 |
| 2007/0053283 A1 | 3/2007 | Bidwell et al. | |
| 2009/0307348 A1 | 12/2009 | O'Neal et al. | |
| 2010/0332210 A1* | 12/2010 | Birdwell | G06F 17/30442 703/22 |
| 2011/0295903 A1* | 12/2011 | Chen | G06F 17/30598 707/794 |
| 2012/0254188 A1* | 10/2012 | Koperski | G06F 17/30663 707/740 |
| 2013/0007188 A1 | 1/2013 | Lowery et al. | |
| 2013/0064176 A1 | 3/2013 | Hsu et al. | |
| 2013/0232263 A1* | 9/2013 | Kelly | H04L 43/10 709/224 |
| 2014/0129560 A1* | 5/2014 | Grokop | G06N 5/043 707/737 |
| 2014/0201133 A1* | 7/2014 | Kawabata | G06F 17/30958 707/609 |
| 2014/0280207 A1* | 9/2014 | Renders | G06F 17/3053 707/748 |
| 2014/0282192 A1* | 9/2014 | Grossman | G06F 3/0484 715/771 |
| 2014/0325364 A1* | 10/2014 | Tee | H04L 41/065 715/736 |
| 2015/0081725 A1* | 3/2015 | Ogawa | G06F 17/30595 707/754 |
| 2015/0100574 A1* | 4/2015 | Presta | G06F 17/30584 707/737 |
| 2015/0100661 A1* | 4/2015 | Heise | H04L 47/125 709/213 |
| 2015/0120713 A1* | 4/2015 | Kim | G06F 17/3053 707/723 |
| 2015/0120717 A1* | 4/2015 | Kim | G06F 17/30699 707/727 |
| 2015/0234915 A1* | 8/2015 | Parthasarathy | G06F 17/30598 707/738 |
| 2015/0261886 A1* | 9/2015 | Wu | G06F 17/30958 707/798 |
| 2016/0048556 A1* | 2/2016 | Kelly | G06F 17/30867 707/767 |
| 2016/0071162 A1* | 3/2016 | Ogawa | G06Q 30/0269 705/14.66 |
| 2016/0260181 A1* | 9/2016 | Singh | E21B 49/00 |
| 2017/0060661 A1* | 3/2017 | Tee | H04L 51/063 |
| 2017/0060663 A1* | 3/2017 | Tee | G06F 17/30958 |
| 2017/0103119 A1* | 4/2017 | Tee | G06F 17/30598 |
| 2017/0141947 A1* | 5/2017 | Tee | H04L 41/065 |
| 2017/0141948 A1* | 5/2017 | Tee | H04L 41/065 |
| 2017/0212952 A1* | 7/2017 | Tee | G06F 17/30598 |

FOREIGN PATENT DOCUMENTS

| | | |
|---|---|---|
| JP | 2012-027589 A | 2/2012 |
| WO | 01/86472 A1 | 11/2001 |

OTHER PUBLICATIONS

Coscia, Michele, Fosca Giannotti, and Dino Pedreschi. "A classification for community discovery methods in complex networks." Statistical Analysis and Data Mining: The ASA Data Science Journal 4.5 (2011): 512-546.*

Falkowski, Tanja, Jörg Bartelheimer, and Myra Spiliopoulou. "Community dynamics mining." ECIS. 2006.*

Van Der Aalst, Wil MP, Hajo A. Reijers, and Minseok Song. "Discovering social networks from event logs." Computer Supported Cooperative Work14.6 (2005): 549-593.*

Oliveira, Márcia, Américo Guerreiro, and João Gama. "Dynamic communities in evolving customer networks: an analysis using landmark and sliding windows." Social Network Analysis and Mining 4.1 (2014): 208.*

May 4, 2016 Extended Search Report issued in European Patent Application No. 16 153 031.6.

Arenas, Alex etal; "Analysis of the structure of complex networks at different resolution levels"; Arxiv.Org, Cornell University Library, 201 Olin Library Cornell University Ithaca, NY 14853; Mar. 23, 2007; pp. 1-25; XP080277086.

Lancichinetti, Andrea et al; "Detecting the overlapping and hierarchical community structure in complex networks"; Arxiv.Org, Cornell University Library, 201 Olin Library Cornell University Ithaca, NY 14853; Feb. 8, 2008; pp. 1-20; XP080399805.

Aug. 10, 2016 Office Action issued in Australian Patent Application No. 2016200128.

* cited by examiner

INFORMATION PROCESSING APPARATUS FOR ANALYZING NETWORK TYPE DATA

CROSS-REFERENCE TO RELATED APPLICATIONS

This application is based on and claims priority under 35 USC 119 from Japanese Patent Application No. 2015-114781 filed on Jun. 5, 2015.

BACKGROUND

1. Technical Field

The present invention relates to an information processing apparatus and a non-transitory computer readable medium.

2. Related Art

In the related art, so-called community (cluster) decomposition may be performed on vector type data to analyze global characteristics in some cases. The community decomposition may be performed on network type data (network information) including nodes and links connecting the nodes in some cases.

SUMMARY

An aspect of the present invention provides an information processing apparatus including: a first network information acquisition unit that acquires first network information including plural event nodes and event links each connecting one pair of event nodes involved in an event, among the plural event nodes; a second network information acquisition unit that acquires second network information including at least two time links each connecting the plural event nodes and plural time nodes, and the one pair of event nodes and the time nodes indicating a time of occurrence of the event; a first community generation unit that generates one or more first communities to which the plural event nodes belong, for the first network information, using a proportion distribution in a case where there is movement between the plural event nodes along the event link; and a second community generation unit that generates one or more second communities to which the plural event nodes and the plural time nodes belong, for the second network information, using a proportion distribution in a case where there is movement between node groups, of which each is configured with the plural event nodes and the plural time nodes, along the time link.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

Figure 1:
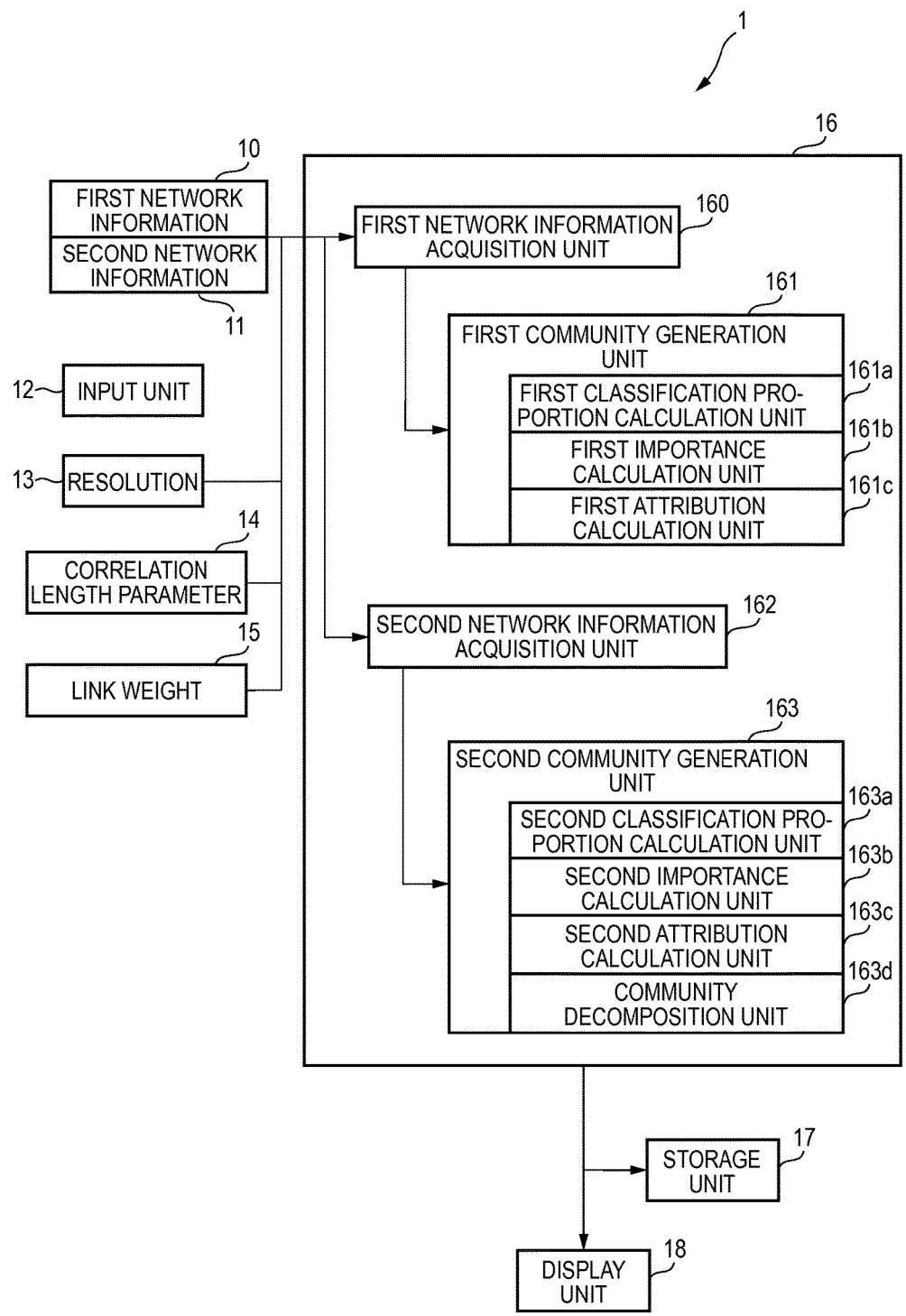
FIG. 1 is a functional block diagram illustrating an information processing apparatus according to the embodiment of the present invention.

FIG. 1 is a configuration diagram of an information processing apparatus 1 according to the embodiment of the present invention. The information processing apparatus 1 acquires first network information 100, second network information 110, a resolution 13, a correlation length parameter 14, and a link weight 15, and includes an input unit 12, a control unit 16, a storage unit 17, and a display unit 18.

The storage unit 17 includes, for example, a random access memory (RAM) and a read only memory (ROM). The storage unit 17 stores the programs that the control unit 16 executes, and also functions as a work memory of the control unit 16. In addition, the programs executed by the control unit 16 and stored in the storage unit 17 may be provided through a telecommunication line, or may be provided by being stored in a computer-readable information storage medium such as a semiconductor memory device.

The first network information 100 includes plural event nodes, and event nodes each of which connects a pair of event nodes involved in an event, among the plural event nodes. The first network information 100 may be, for example, data of the position of a person in an organization, friend-related data, and the like. When the friend-related data is the first network information 100, the event node corresponds to a person, and the event link corresponds to the contact (transmitting and receiving e-mail, or the like) between people. The first network information 100 may indicate the relationship of association between at least event nodes (the relationship between the event node and the event link), or may not indicate specific contents contained in the event node (person name, and the like).

The second network information 110 includes plural event nodes and plural time nodes, and at least two time nodes: a time link connecting plural event nodes with plural time nodes, and a time link connecting a pair of event nodes involved in an event, among the plural event nodes, with a time node indicating a time of occurrence of an event. The second network information 110 includes network information including the first network information 100, and the time node in addition to the event node. The time node is a node used for indicating a time of occurrence of the event. Further, the second network information 110 includes the time link in addition to the event link. The time link connects the time node indicating a time of occurrence of an event, and a pair of event nodes involved in an event. For example, if the friend-related data is the first network information 100, when there is contact between people, a time link is formed between the time node corresponding to the time of occurrence of the contact and a pair of event nodes corresponding to the people involved in the contact. Thus, since the information processing apparatus 1 according to the present embodiment includes the second network information 110 including the time node and the time link, network information of which contents change with time is handled.

The input unit 12 is, for example, a keyboard, a mouse, and the like, and transmits the instruction by the user to the control unit 16. The resolution 13 is a positive real number, and a parameter for determining the size of a community, when the information processing apparatus 1 generates the community from the first network information 100 and the second network information 110.

The control unit 16 includes, for example, a central processing unit (CPU), and controls the entire information processing apparatus 1 by executing the programs stored in the storage unit 17. The control unit 16, functionally, includes a first network information acquisition unit 160, a first community generation unit 161, a second network information acquisition unit 162, and a second community generation unit 163. Here, the first community generation unit 161 includes a first classification proportion calculation unit 161a, a first importance calculation unit 161b, and a first attribution calculation unit 161c. Further, the second community generation unit 163 includes a second classification proportion calculation unit 163a, a second importance calculation unit 163b, a second attribution calculation unit 163c, and a community decomposition unit 163d. The control performed by the control unit 16 will be described in detail later.

The storage unit 17 is configured to include, for example, a random access memory (RAM) and a read only memory (ROM). The storage unit 17 stores the programs that the control unit 16 executes, and also functions as a work memory of the control unit 16. In addition, the programs executed by the control unit 16 and stored in the storage unit 17 may be provided through a telecommunication line, or may be provided by being stored in a computer-readable information storage medium such as a semiconductor memory device. The display unit 18 displays information processed by the control unit 16 to the user, and is, for example, a liquid crystal display.

In addition, the first network information 100, the second network information 110, the resolution 13, the correlation length parameter 14, and the link weight 15 may be input by the user through the input unit 12, may be stored in the storage unit 17, or may be provided through a telecommunication line.

Figure 2:
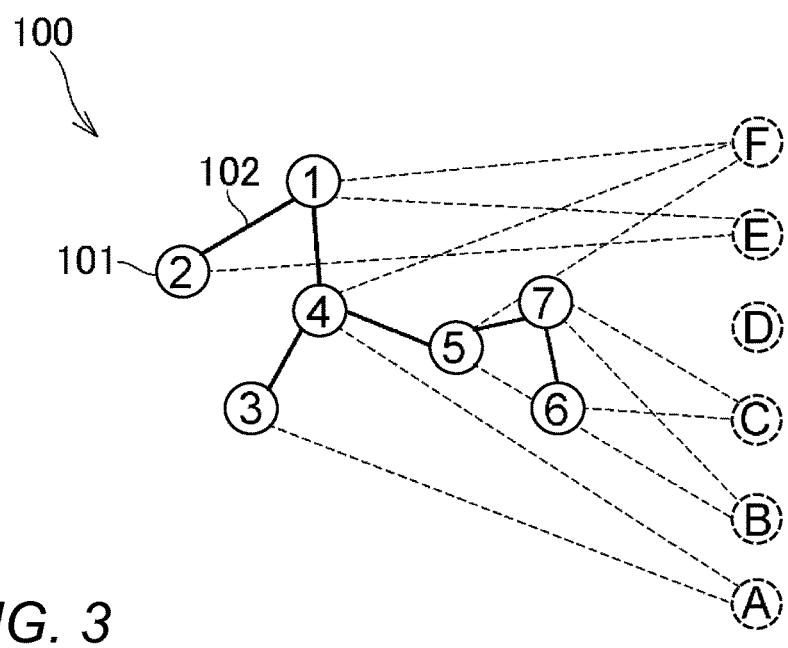
FIG. 2 is a diagram illustrating an example of first network information acquired by the information processing apparatus according to the embodiment of the present invention.

FIG. 2 is a diagram illustrating an example of the first network information 100 acquired by the information processing apparatus 1 according to the embodiment of the present invention. The first network information 100 of this example includes seven event nodes 101, and six event links 102. The respective event nodes 101 are given the event node numbers of 1 to 7, and for example, the node of the event node number 1 (hereinafter, represented as an event node [1]) is connected to an event node [2] by an event link. Although the present embodiment exemplifies the first network information 100 with seven event nodes for the purpose of simplicity of explanation, the number of event nodes and the number of event links may be larger than the above numbers, and for example, may be about one hundred thousand. The event link connecting event nodes has no direction in the first network information 100 of this example, but the event link may have a one-way direction. In addition, in FIG. 2, the time nodes and the time links included in the second network information are indicated by broken lines. The second network information will be described in detail with reference to the following diagram.

Figure 3:
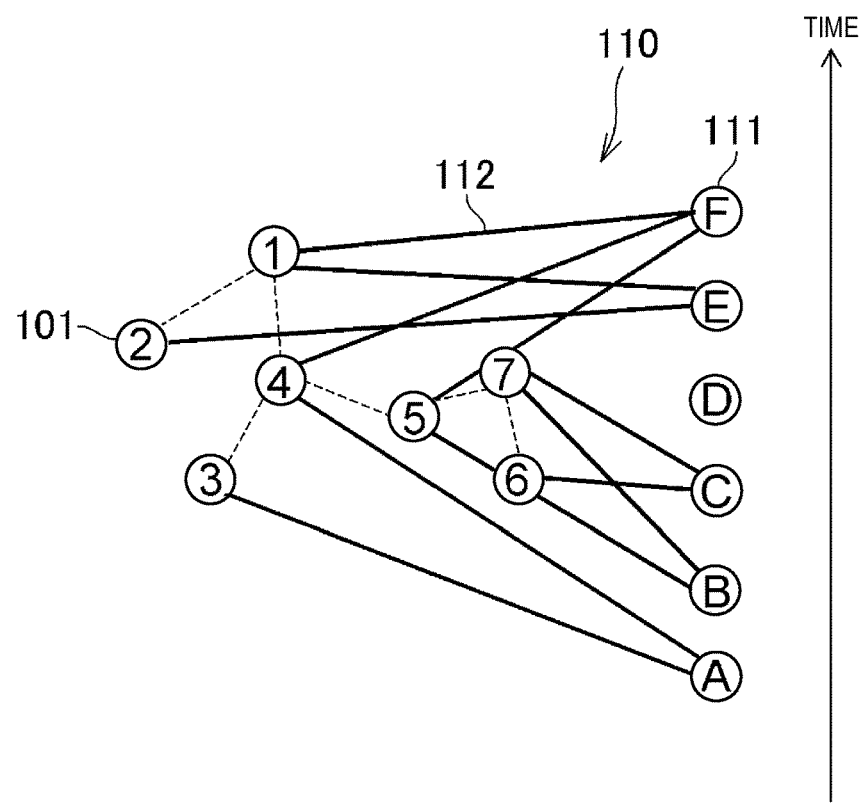
FIG. 3 is a diagram illustrating an example of second network information acquired by the information processing apparatus according to the embodiment of the present invention.

FIG. 3 is a diagram illustrating an example of the second network information 110 acquired by the information processing apparatus 1 according to the embodiment of the present invention. The second network information 110 of this example includes seven event nodes 101, six time nodes 111, and eleven time links. The respective event nodes 101 are given the event node numbers of 1 to 7, and the respective time nodes 111 are given symbols of A to F. In FIG. 3, an arrow indicating the traveling direction of time is indicated, a time node [A] is a time node 111 representing the most past time, and time nodes [A] to [F] are arranged in chronological order. For example, the time node [A] is a node corresponding to May 1, 2015, and time nodes [B] to [F] may be nodes respectively corresponding to days of May 2, 2015 to May 6, 2015. Further, each node may not correspond to a day, but rather correspond to a month, or hour:minute:second, and a time interval between corresponding times of the time nodes 111 may not be equally spaced. In addition, in FIG. 3, event links included in the first network information 100 are indicated by broken lines.

The time link 112 included in the second network information 110 connects the event node 101 and the time node 111, and represents a time when an event has occurred. For example, in this example, the time link [A] and the event nodes [3] and [4] are respectively connected by the time link 112. This represents information indicating that the event involved in the event nodes [3] and [4] has occurred in the time indicated by the time node [A]. Similarly, it is known that the event involved in the event nodes [5] and [7] has occurred in the time indicated by the time node [B], the event involved in the event nodes [6] and [7] has occurred in the time indicated by the time node [C], and the event involved in the event nodes [1] and [2] has occurred in the time indicated by the time node [E]. Further, it is known that the event involved in the event nodes [1] and [4] and the event involved in the event nodes [4] and [5] have occurred in the time indicated by the time node [F].

When the weight of the event link 102 is set to 1, the time link 112 has a weight $\omega$ determined by the link weight 15. Here, $\omega$ is a real number greater than 0. Further, $\omega$ may be 1 or more. Thus, it is possible to adjust the size of the influence of the time link 112 to the event link 102, in the alternating sequential calculation by the first community generation unit 161 and the second community generation unit 163 to be described later.

The second network information 110 includes the time link 112, and thus records a time when an event has occurred. Here, the event may occur with a time correlation. For example, when network information is generated based on the event of transmitting and receiving an e-mail between people, if one e-mail is transmitted, a reply mail is expected to be exchanged for a fixed time. In this way, since a situation is handled in which the occurrence of an event is concentrated in a certain time range due to a single event, the second network information 110 may include a time correlation link connecting the time nodes 111 with each other. Alternately, the second network information 110 may include a time correlation time link associated with the time link 112 connecting the event node 101 and the time node 111. The time correlation link will be describe in detail with reference to the following diagram. Further, the time correlation time link will be described in detail with reference to FIG. 5.

Figure 4:
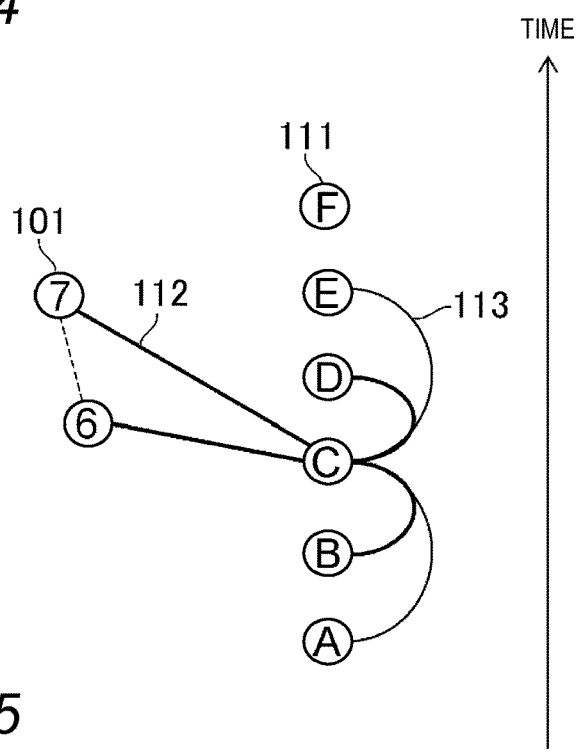
FIG. 4 is a diagram illustrating an example of a time correlation link of the second network information acquired by the information processing apparatus according to the embodiment of the present invention.

FIG. 4 is a diagram illustrating an example of the time correlation link 113 of the second network information 110 acquired by the information processing apparatus 1 according to the embodiment of the present invention. In FIG. 4, for the purpose of simplicity of explanation, the event nodes [6] and [7] among nodes included in the second network information 110 illustrated in FIG. 3 and the time nodes [A] to [F] are illustrated. The event nodes [6] and [7] and the time node [C] are respectively connected by the time link 112, and this indicates that events have occurred at the time indicated by the time node [C]. Further, a time correlation link 113 is illustrated in in FIG. 4, which connects the time node [C] indicating the time of occurrence of the events and other time nodes [A], [B], [D], and [E], has a weight which becomes smaller, as the time node becomes further away from the time of occurrence of the event, and indicates a time range having a time correlation with the event. Since the time correlation becomes smaller as the time node becomes further away from the time of occurrence of the event, the time correlation link 113 connecting the time node that is further away from the time node [C] indicating the time of occurrence of the events has a smaller weight. In addition, in the example illustrated in FIG. 4, the time correlation links 113 are arranged symmetrically around the time node [C] indicating a time of occurrence of an event, but the time correlation link 113 may be arranged asymmetrically around the time node indicating a time when an event has occurred. For example, the time correlation link may be provided only between the time node indicating a time earlier than the time of occurrence of the event and the event node. It is possible to represent a causal relationship of the event, by providing the time correlation link 113 only between the time node indicating a time earlier than the time of occurrence of the event and the event node. Thus, a community is generated in the time range having the influence of the event, by acquiring the second network information 110 including the time correlation link 113.

The weight of the time correlation link 113 is determined by a function including a correlation length parameter $\tau$ indicating a time range having a correlation with the time of occurrence of the event. In the information processing apparatus 1 according to the present embodiment, the function for determining the weight of the time correlation link 113, with the weight of the time link 112 as 1, is given as $\exp(-([t]-[e])^2/2\tau^2)$. Here, ([t]–[e]) represents a time difference between an interest time node [t] and the time node [e] indicating the time when the event has occurred. Incidentally, a function obtained by constant-multiplying the above function may be used as a function for determining the weight, and a different function may be employed. For example, a function may be used in which as the time node is further away from the time of occurrence of the event, the weight linearly decreases, and the function has a value only in the range of the correlation length parameter $\tau$ around the time of occurrence of the event. In this way, since the weight of a time correlation link 113 is determined by the function including the correlation length parameter $\tau$, the time range having a correlation with the event is adjusted by a single parameter, and the handling of time correlation becomes easy.

Figure 5:
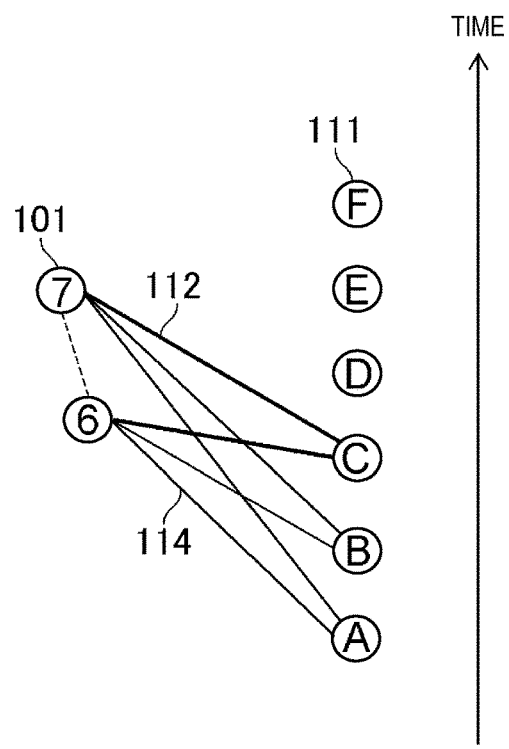
FIG. 5 is a diagram illustrating an example of the time correlation link of the second network information acquired by the information processing apparatus according to the embodiment of the present invention.

FIG. 5 is a diagram illustrating an example of the time correlation time link 114 of the second network information 110 acquired by the information processing apparatus 1 according to the embodiment of the present invention. In FIG. 5, for the purpose of simplicity of explanation, the event nodes [6] and [7], and the time nodes [A] to [F] are illustrated, among nodes included in the second network information 110 illustrated in FIG. 3. The event nodes [6] and [7] and the time node [C] are respectively connected by the time link 112, and it is indicated that the event has occurred in the time indicated by the time node [C]. Further, an even number of the time correlation time links 114 are illustrated in in FIG. 5, which connect a pair of event nodes [6] and [7] involved in an event, with the time nodes (time nodes [A] and [B]) indicating the time node [C] indicating a time of occurrence of the event and the time range having a correlation with the time of occurrence of the event. The number of the time correlation time links 114 is two for each of the time nodes [A] and [B], and the time range having a correlation with the event which occurred in the time indicated by the time node [C] represents the times indicated by the time nodes [A] and [B]. In addition, FIG. 5 illustrates an example in which the time correlation time links 114 are provided between the time nodes indicating the times earlier than the time of occurrence of the event and the event nodes, but the time correlation time link 114 may be provided between the time nodes indicating the times later than the time of occurrence of the event and the event nodes. Further, as the weight of the time correlation time link 114, a weight may be given that becomes smaller as the time node becomes further away from the time of occurrence of the event. Thus, a community is generated in the time range having the influence of the event, by introducing the time correlation time link 114, without increasing the types of links, in addition to the time link 112.

Figure 6:
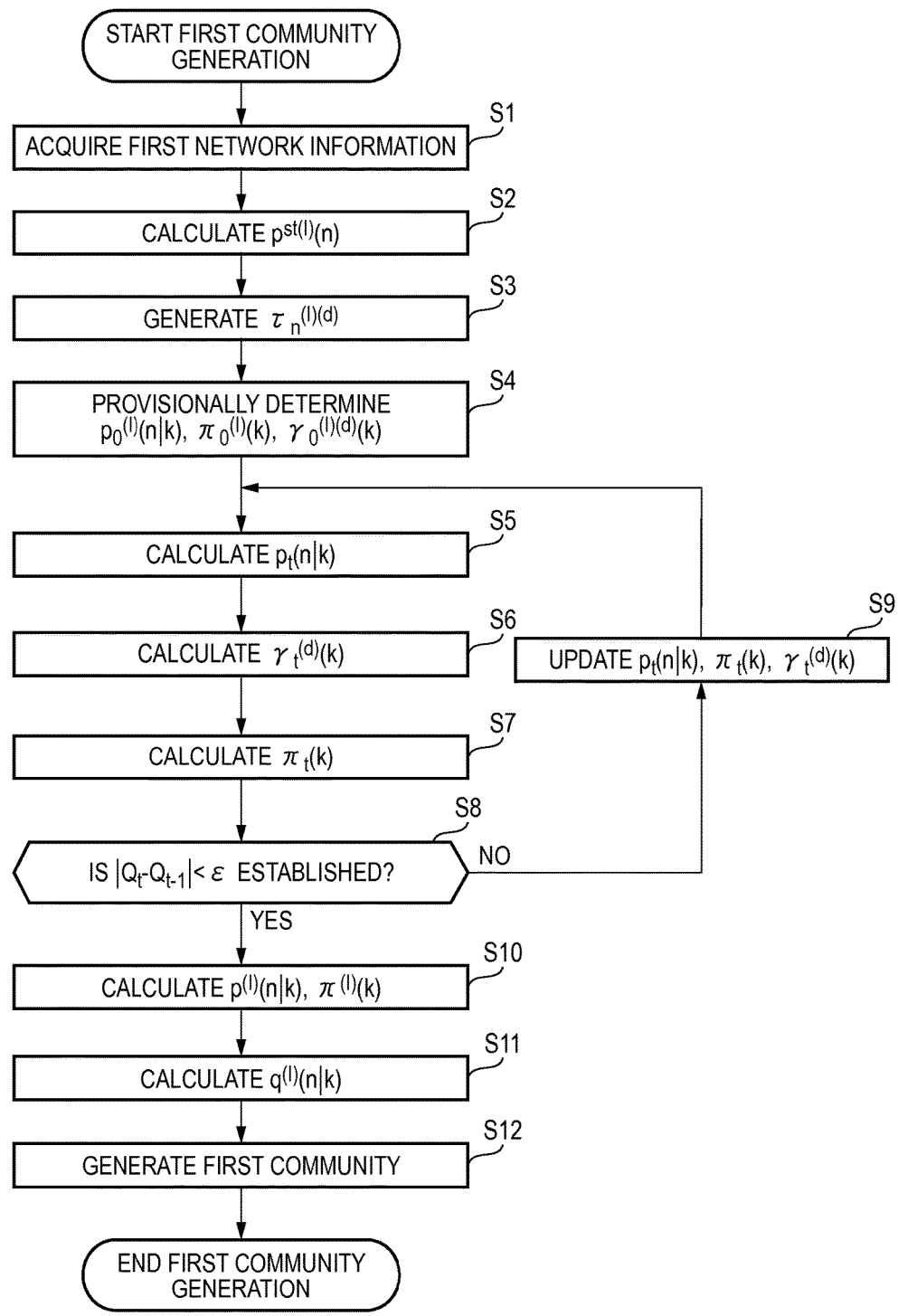
FIG. 6 is a flowchart illustrating first community generation by the information processing apparatus according to the embodiment of the present invention.

FIG. 6 is a flowchart of first community generation in the information processing apparatus 1 according to the embodiment of the present invention. The first community generation unit 161 according to the present embodiment generates one or more first communities to which plural event nodes 101 belong, with respect to the first network information 100, using the probability distribution in the case where there is movement between plural event nodes 101 along the event link 102. Hereinafter, the flow of the first community generation by the first community generation unit 161 will be described in detail.

First, the first community generation unit 161 acquires the first network information 100, by the first network information acquisition unit 160 (S1). Next, the first community generation unit 161 calculates the first stationary probability distribution $p^{st(I)}(n)$ in the case where there is movement between the event nodes 101 included in the first network information 100 along the event link 102 (S2). The first stationary probability distribution $p^{st(I)}(n)$ is a stationary probability distribution in the case where there is random transition between E pieces of the event nodes 101 along the event link. The first stationary probability distribution $p^{st(I)}(n)$ is obtained by solving a coalition E-order equation defined by following Equation (1). The stationary probability distribution $p^{st(I)}(n)$ is an eigenvector of the matrix $T^{(I)}$, and the eigenvalue is 1.

$$p^{st(I)}(n) = \sum_{m=1}^{E} T_{nm}^{(I)} p^{st(I)}(m) \quad \text{[Equation 1]}$$

Here, the matrix $T^{(I)}$ represents the transition probability in the case where there is random transition between the event nodes 101 along the event link 102. If a description is made based on an example of the first network information 100 illustrated in FIG. 2, when there is random transition to another event node along the event link 102, with the event node [1] as a starting point, a transition is made to the event node [2] at half the probability and a transition is made to the event node [4] at half the probability. If these transition probabilities are arranged and expressed, the first column of the matrix $T^{(I)}$ is obtained. Other elements of the matrix are obtained similarly. In general, in the case where the total number of nodes is N, using a matrix A, in which $A_{nm}=1$ when the event node [n] and the event node [m] are connected by the event link, and $A_{nm}=0$ when the event node [n] and the event node [m] are not connected by the event link, the matrix $T^{(I)}$ is defined by $T^{(I)}_{nm}=A_{nm}/\Sigma_s A_{sm}$. Since the total number of the transition probabilities is 1, $\Sigma_n T^{(I)}_{nm}=1$ is established for any event node [m].

If there is a concern about problems such as a so-called rank sink, and a concern in which the value of the stationary probability distribution is likely to be concentrated in a particular node, the first stationary probability distribution $p^{st(I)}(n)$ may be obtained, for example, based on the relationship $p^{st(I)}(n)=(1-r)\Sigma_m T^{(I)}_{nm} p^{st(I)}(m)+r$, obtained by deforming Equation (1). Here, r is a real number of 0 or more and 1 or less. r represents the probability of random transition between event nodes not along the event link.

Next, plural pieces of first pass information $\tau_{n(I)(d)}$ are generated which indicate the event nodes that are passed through in the case where there is random transition between plural event nodes along the event link (S3). In the present embodiment, the first pass information is generated by setting $\tau_n^{(I)(d)}=1$ to the event node [n] that is selected according to the first stationary probability distribution $p^{st(I)}(n)$, and setting $\tau_m^{(I)(d)}=1$ to the event node [m] that is selected according to the $T^{(I)}_{mn}$ giving the probability to transition to the event node [m], with the event node [n] as a starting point. Such an E-dimensional vector is generated D number of times. The first pass information $\tau_n^{(d)}$ is an amount satisfying $\Sigma_n \tau_n^{(I) \times (d)}=2$. The first pass information $\tau_n^{(I)(d)}$ represents the case where a virtual agent is found on the event link connecting the event node [n] and the event node [m], when the virtual agent randomly transitions between event nodes along the event link.

The first classification proportion calculation unit 161a and the first importance calculation unit 161b according to the present embodiment respectively calculate the first classification proportion $p^{(I)}(n|k)$ and the first importance $\pi^{(I)}(k)$ through the sequential calculation. The first classification proportion calculation unit 161a calculates the classification proportion, by which the interest event node is classified into each of the plural communities of a predetermined number of the first network information 100, so as to have the classification proportion by which the interest event node and the adjacent event node connected by the event link are classified into each of the plural communities and the correlation according to a predetermined resolution 13. To begin the sequential calculation, $p_0^{(I)}(n|k)$, $\pi_0^{(I)}(k)$, and $\gamma_0^{(I)(d)}(k)$ are provisionally determined (S4). Here, it is assumed that values satisfying $\Sigma_n p_0^{(I)}(n|k)=1$ and $\Sigma_k \pi_0^{(I)}(k)=1$ are given. Since $p_0^{(I)}(n|k)$ indicates the proportion by which the event nodes of n=1 to E are classified for the components of k=1 to C, the positive real numbers of C×E−1 are given in the provisional determination. Further, since $\pi_0^{(I)}(k)$ indicates the importance, for the community of the network that is classified into k=1 to C, the positive real numbers of C−1 are given in the provisional determination. Since $\gamma_0^{(I)(d)}(k)$ is a coefficient representing a proportion occupied by the community [k] for all of plural communities, and is a coefficient determined according to the pass information $\tau^{(I)(d)}$ of d=1 to D, the positive real numbers of C×D are given in the provisional determination.

Further, the first classification proportion calculation unit 161a and the first importance calculation unit 161b according to the present embodiment uses the resolution 13 that is the positive real number α, as a parameter for determining the size of the community of a network. Here, α is a value that the user can freely determine, but it is preferable to set a value that is sufficiently fine for the community classification of the first network information 100.

In the first step of the sequential calculation, the classification proportion $p_t(n|k)$ is calculated by the t-th sequential calculation (S5). Here, t is a positive integer, and represents the number of sequential calculations. $p_t(n|k)$ is calculated by $p_{t-1}(n|k)$, $\pi_{t-1}(k)$, and $\gamma_{t-1}^{(d)}(k)$ that are obtained by the one previous sequential calculation. For example, in the first sequential calculation performed after the provisional determination (S3), $p_1(n|k)$ is obtained by using $p_0^{(I)}(n|k)$, $\pi_0^{(I)}(k)$, and $\gamma_0^{(I)(d)}(k)$.

The first classification proportion calculation unit 161a according to the present embodiment calculates the classification proportion $p_t(n|k)$ by the t-th sequential calculation, based on the relationship determined by following Equation (2) (S5).

$$p_t(n \mid k) = \frac{\alpha}{\alpha + 2D_{t-1}(k)} \sum_{m=1}^{E} T_{nm}^{(I)} p_{t-1}(m \mid k) + \frac{1}{\alpha + 2D_{t-1}(k)} \sum_{d=1}^{D} \gamma_{t-1}^{(d)}(k) \tau_n^{(I)(d)} \quad \text{[Equation 2]}$$

In the present embodiment, the resolution 13 the parameter by which as α approaches 0, the particle size of the community decomposition becomes finer, and as α approaches infinity, the particle size of the community decomposition becomes rougher. Further, $D_{t-1}(k)$ is a coefficient determined from $\gamma_{t-1}^{(d)}(k)$, and $D_{t-1}(k)=\Sigma_d \gamma \gamma t-1^{(d)}(k)$.

The classification proportion $p_t(n|k)$ is calculated by values having a first contribution (the first term on the right side) that becomes larger, as the classification proportion $p_{t-1}(m|k)$ for the community [k] including the event node [n] and the event node (the event node [m], where $T^{(I)}_{nm} \neq 0$) becomes larger, and a second contribution (the second term on the right side) that becomes larger, as the proportion $\gamma_{t-1}^{(d)}(k)$ occupied by the community [k] for all of plural communities becomes larger.

Further, the first contribution is determined by the first coefficient $\alpha/(\alpha+2D_{t-1}(k))$ that approaches 1, as the resolution 13 becomes rougher (α is brought close to infinity) and the classification proportion $p_{t-1}(m|k)$ that has been calculated immediately before with respect to the event node (the event node [m], where $T^{(I)}_{nm} \neq 0$) having the event link with the event node [n]. Further, the second contribution is determined by the second coefficient $1/(\alpha+2D_{t-1}(k))$ that approaches 0, as the resolution 13 becomes rougher ($\alpha$ is brought close to infinity), plural pieces of first pass information $\tau_n^{(I)(d)}$, and the proportion $\gamma_{t-1}^{(d)}(k)$ occupied by the community [k] for all of plural communities. As described below, the proportion $\gamma_{t-1}^{(d)}(k)$ occupied by the community [k] for all of plural communities is calculated from the classification proportion $p_{t-1}(n|k)$ and the importance $\pi_{t-1}(k)$ that have been calculated immediately before.

Next, the proportion $\gamma_t^{(d)}(k)$ occupied by the community [k] for all of plural communities is calculated from the classification proportion $p_{t-1}(n|k)$, the importance $\pi_{t-1}(k)$, and plural pieces of first pass information $\tau_n^{(I)(d)}$ that have been calculated immediately before (S6). In the present embodiment, the proportion $\gamma_t^{(d)}(k)$ is calculated by following Equation (3). The proportion $\gamma_t^{(d)}(k)$ has a larger value for a community having a relatively larger importance among all communities.

$$\gamma_t^{(d)}(k) = \frac{\pi_{t-1}(k)\prod_{n=1}^{E}(p_{t-1}(n|k))^{\tau_n^{(I)(d)}}}{\sum_{j=1}^{C}\left(\pi_{t-1}(j)\prod_{m=1}^{E}(p_{t-1}(m|j))^{\tau_m^{(I)(d)}}\right)} \quad \text{[Equation 3]}$$

Further, the importance $\pi_t(k)$ of the community [k] of the network is calculated (S7). The importance $\pi_t(k)$ is calculated so as to have a larger value, as the proportion $\gamma_t^{(d)}(k)$ occupied by the community [k] for all of plural communities becomes larger. The first importance calculation unit 161b calculates the importance $\pi_t(k)$ of one community [k] of plural communities so as to have a larger value, as the proportion $\gamma_t^{(d)}(k)$ occupied by one community [k] for plural communities becomes larger, using the classification proportion $p_{t-1}(n|k)$ that is calculated by the first classification proportion calculation unit 161a. In the present embodiment, the importance $\pi_t(k)$ of the community [k] is calculated by following Equation (4).

$$\pi_t(k) = \frac{D_{t-1}(k)}{\sum_{j=1}^{C} D_{t-1}(j)}, \quad \text{[Equation 4]}$$

$$D_{t-1}(k) = \sum_{d=1}^{D} \gamma_{t-1}^{(d)}(k)$$

The classification proportion $p_t(n|k)$, the importance $\pi_t(k)$, and the proportion $\gamma_t^{(d)}(k)$ are calculated from the classification proportion $p_{t-1}(n|k)$, the importance $\pi_{t-1}(k)$, and proportion $\gamma_{t-1}^{(d)}(k)$ which have been calculated immediately before, and the first pass information $\tau_n^{(d)}$, by the following equations (2), (3) and (4).

Whether or not to end the sequential calculation performed by the first classification proportion calculation unit 161a and the first importance calculation unit 161b is determined by whether or not the absolute value $|Q_t - Q_{t-1}|$ of a difference in the evaluated value $Q_t$ before and after the sequential calculation is smaller than the predetermined reference value $\varepsilon$ (S8). In the present embodiment, the evaluated value $Q_t$ is the amount determined by following Equation (5).

$$Q_t = \sum_{k=1}^{C}\sum_{d=1}^{D}\gamma_t^{(d)}(k)\log(\pi_t(k)) + \quad \text{[Equation 5]}$$

-continued $$\sum_{k=1}^{C}\sum_{n=1}^{E}\left(\sum_{d=1}^{D}\gamma_t^{(d)}(k)\tau_n^{(I)(d)} + \alpha\sum_{m=1}^{E}T_{nm}^{(I)}p_t(m|k)\right)$$

$$\log(p_t(n|k))$$

If $|Q_t - Q_{t-1}| < \varepsilon$ is not established, the classification proportion $p_t(n|k)$, the importance $\pi_t(k)$ and the proportion $\gamma_t^{(d)}(k)$, which are the latest, are updated to the classification proportion, the importance, and the proportion which are the previous (S9). Thereafter, a series of processes are repeated: a process (S5) of calculating the classification proportion $p_{t+1}(n|k)$, a process (S6) of calculating the proportion $\gamma_{t+1}^{(d)}(k)$, a process (S7) of calculating the importance $\pi_{t+1}(k)$, and a process of determining whether or not $|Q_{t+1} - Q_t| < \varepsilon$ is established (S8). The first classification proportion calculation unit 161a and the first importance calculation unit 161b according to the present embodiment repeat the above processes until the absolute value of the difference in the evaluated values becomes smaller than a predetermined value, and calculates the first classification proportion and the first importance through the sequential calculation. Thus, the community classification of the first network information 100 is asymptotically performed.

Meanwhile, if $|Q_t - Q_{t-1}| < \varepsilon$ is established, the first classification proportion by which the event node [n] is classified into the community [k] is determined by $p^{(I)}(n|k) = p_t(n|k)$, and the first importance of the community [k] is determined by the $\pi^{(I)}(k) = \pi_t(k)$ (S10). Here, the subscript (I) indicates that these values are the values used for the first community generation. According to the information processing apparatus 1 according to the present embodiment, the first classification proportion $p^{(I)}(n|k)$ and the first importance $\pi^{(I)}(k)$ is obtained in any precision by adjusting the predetermined value $\varepsilon$, and the community classification of a network is performed in any precision. Incidentally, the number of sequential calculations is determined in advance, and the values of $p_t(n|k)$ and $\pi_t(k)$ in the case of performing the sequential calculation the determined number of times may respectively be determined as the first classification proportion $p^{(I)}(n|k)$ and the first importance $\pi^{(I)}(k)$.

Next, the first attribution calculation unit 161c calculates the first attribution so as to have a larger value, as the first classification proportion $p^{(I)}(n|k)$ becomes larger by which the event node [n] is classified into the community [k], with respect to each of plural event nodes (S11). In the present embodiment, the first attribution $q^{(I)}(k|n)$ which the event node [n] attributes to the community [k] is obtained by following Equation (6).

$$q^{(I)}(k|n) = \frac{\pi^{(I)}(k)p^{(I)}(n|k)}{\sum_{j=1}^{C}\pi^{(I)}(j)p^{(I)}(n|j)} \quad \text{[Equation 6]}$$

As seen from Equation (6), the first attribution $q^{(I)}(k|n)$ is a value satisfying $\Sigma_k q^{(I)}(k|n) = 1$. In other words, the sum of the first attributions which a certain event node attributes to each community is 1. The first attribution $q^{(I)}(k|n)$ is a value obtained by relatively measuring the degree which a certain event node [n] attributes to the community [k] for all communities.

The first community generation unit 161 generates one or more first communities of the first network information 100, to which the interest event node [n] belongs, from the first classification proportion $p^{(I)}(n|k)$ for the interest event node [n], that is calculated so as to have a correlation according to the value α of the resolution 13 (S12). The first community generation unit 161 may determine the proportion by which the interest event node [n] belongs to the community [k], based on the value of the first classification proportion $p^{(I)}(n|k)$. Further, the first community generation unit 161 may generate the first community to which the interest event node [n] belongs, based on the first attribution $q^{(I)}(k|n)$ that is calculated from the first classification proportion $p^{(I)}(n|k)$ and the first importance $\pi^{(I)}(k)$. In this case, the proportion by which the interest event node [n] belongs to the community [k] is determined by the value of the first attribution $q^{(I)}(k|n)$. In any case, the first community generation unit 161 generates two or more first communities to which the interest event node [n] belongs. Therefore, according to the first community generation unit 161 according to the present embodiment, the community classification representing the case where one node has plural attributes is performed.

Figure 7:
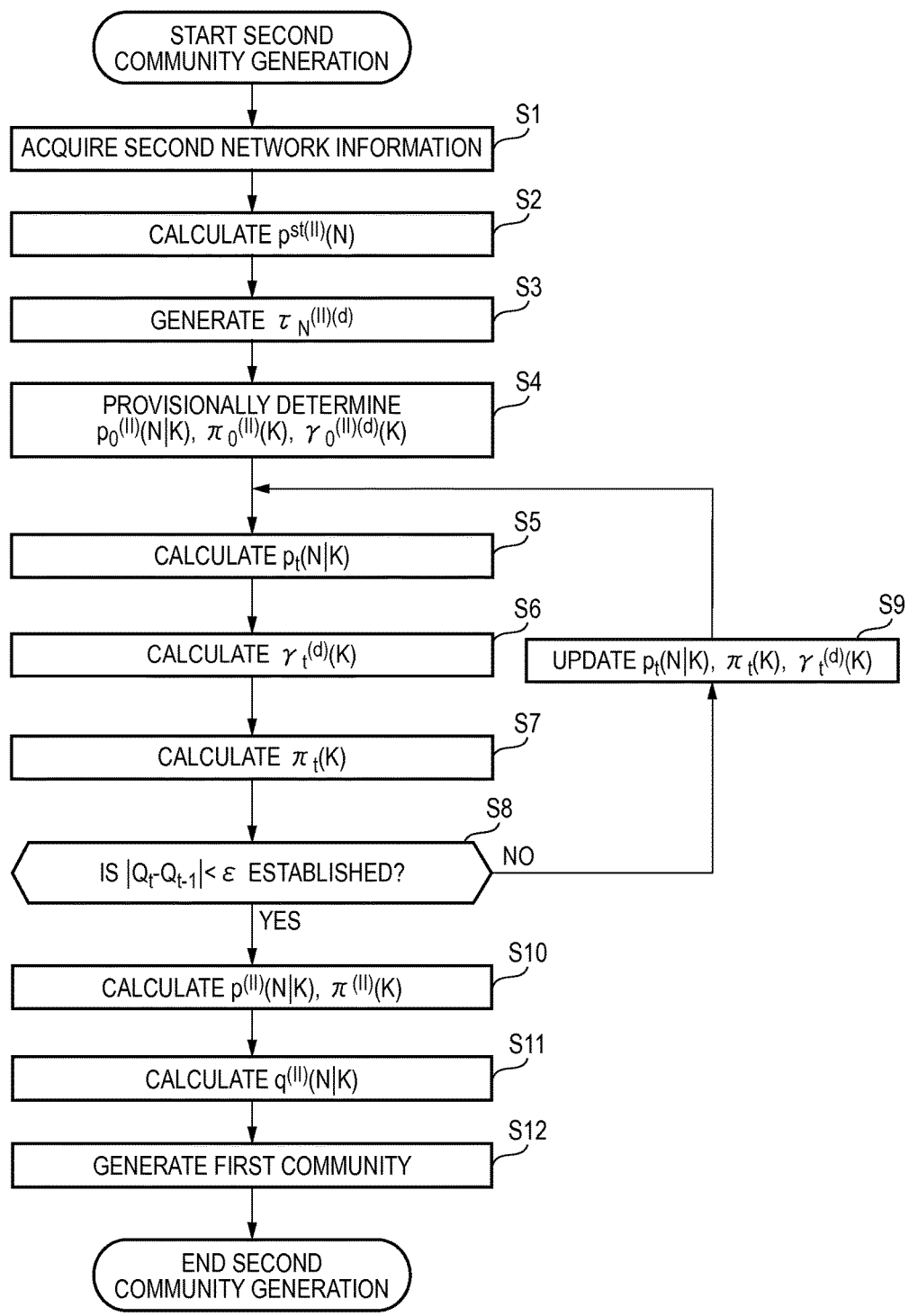
FIG. 7 is a flowchart illustrating second community generation by the information processing apparatus according to the embodiment of the present invention.

FIG. 7 is a flowchart illustrating second community generation by the information processing apparatus 1 according to the embodiment of the present invention. The second community generation unit 163 according to the present embodiment generates one or more second communities to which plural event nodes 101 and plural time nodes 111 belong, for the second network information 110, using the probability distribution in the case where there is movement between the node groups each being configured with the plural event nodes 101 and plural time nodes 111, along the time link 112. The second community generation unit 163 may generate one or more second communities to which plural event nodes 101 and plural time nodes 111 belong, using the probability distribution in the case where there is movement between the node groups along the time link 112 and the time correlation link 113. Further, the time correlation time link 114 may be included as the time link 112. Since the flow of the second community generation by the second community generation unit 163 is similar to the flow of the first community generation by the first community generation unit 161, the difference will be described in detail, and the description is not repeated.

First, the second community generation unit 163 acquires the second network information 110, by the second network information acquisition unit 162 (S21). Next, the second community generation unit 163 calculates the second stationary probability distribution $p^{st(II)}(N)$ in the case where there is movement between node groups, each being configured with plural event nodes 101 and plural time nodes 111 included in the second network information 110, along the time links 112 (S22). Here, in the case of the second network information 110 illustrated in FIG. 3, the symbol N is values of the N=1 to 7 indicating the event nodes [1] to [7] and N=8 to 13 indicating the time nodes [A] to [F]. The second stationary probability distribution $p^{st(II)}(N)$ is a stationary probability distribution in the case where there is random transition between node groups including E pieces of event nodes 101 and T pieces of time nodes 111 along the time links 112. The second stationary probability distribution $p^{st(II)}(N)$ is obtained by solving a coalition (E+T)-order equation defined by the relationship obtained by replacing the matrix $T^{(I)}$ in Equation (1) with the matrix $T^{(II)}$. Here, matrix $T^{(II)}$ is (E+T)×(E+T) matrix, and is a transition probability in the case where there is random transition between the event node 101 and the time node 111 along the time link 112. If a description is made based on an example of the second network information 110 illustrated in FIG. 3, when there is random transition to the time node along the time link 112, with the event node [1] as a starting point, a transitions is made to the time node [E] at half the probability and a transitions is made to the time node [F] at half the probability. If these transition probabilities are arranged and expressed, the first column of the matrix $T^{(II)}$ is obtained. Further, when there is random transition to the event node along the time link 112, with the time node [A] as a starting point, a transitions is made to the event node [3] at half the probability and a transitions is made to the event node [4] at half the probability. If these transition probabilities are arranged and expressed, the eighth column of the matrix $T^{(II)}$ is obtained. Here, $\Sigma_N T^{(II)}_{NM}=1$ is established for any node [N].

When the second network information 110 includes the time correlation link 113, the matrix $T^{(II)}$ represents the transition probability in the case of random transition between the event node 101 and the time node 111, along the time link 112 and the time correlation link 113. Further, when the second network information 110 includes the time correlation link 114, the matrix $T^{(II)}$ represents the transition probability in the case of random transition between the event node 101 and the time node 111, along the time link 112 and the time correlation time link 114.

Next, plural pieces of first pass information $\tau_N^{(II)(d)}$ is generated which indicates the event nodes and the time nodes that are passed through in the case where there is random transition between node groups including plural event nodes and plural time nodes along the plural time links (S23). In the present embodiment, the second pass information is generated by setting $\tau_N^{(II)(d)}=1$ to the node [N] (node included in the node group including event nodes and time nodes) that is selected according to the second stationary probability distribution $p^{st(II)}(N)$, and setting $\tau_M^{(II)(d)}=1$ to the node [M] that is selected according to the $T^{(II)}_{MN}$ giving the probability to transition to the node [M], with the node [N] as a starting point. Such E+T-dimensional vector is generated D number of times.

The second classification proportion calculation unit 163a and the second importance calculation unit 163b according to the present embodiment respectively calculate the second classification proportion $p^{(II)}(N|K)$ and the second importance $\pi^{(II)}(K)$, through the sequential calculation. To begin the sequential calculation, $p_0^{(II)}(N|K)$, $\pi_0^{(II)}(K)$, and $\gamma_0^{(II)(d)}(K)$ are provisionally determined (S24). Further, the resolution 13 that is a positive real number a is used as a parameter for determining the size of the community of a network.

The second community generation unit 163 according to the present embodiment performs the second community generation by using a calculation result of the first community generation unit 161. Specifically, the second classification proportion calculation unit 163a and the second importance calculation unit 163b according to the present embodiment determine the value related to the event node 101 (the value in the case of N=1 to E) among $p_0^{(II)}(N|K)$ which are tentative values, the value of $\pi_0^{(II)}(K)$, and the value of $\gamma_0^{(II)(d)}(K)$, by the values of the first classification proportion $p^{(I)}(n|k)$, the first importance $\pi^{(I)}(k)$ and the latest proportion $\gamma_t^{(d)}(k)$, which are calculated by the first classification proportion calculation unit 161a and the first importance calculation unit 161b. Since the determination performed as described above, the amount of calculation is reduced and the time required for the second community generation is shortened, as compared with the case of randomly determining the tentative value. In addition, more accurate second community generation is performed.

In the first step of the sequential calculation, the classification proportion $p_t(n|k)$ by the t-th sequential calculation is calculated by the relationship obtained by replacing the matrix $T^{(I)}$ and the first pass information $\tau_n^{(I)(d)}$ in Equation (2) with the matrix $T^{(II)}$ and the second pass information $T_N^{(II)(d)}$ (S25).

Next, the proportion $\gamma_t^{(d)}(K)$ occupied by the community [K] relative to the entire plural communities is calculated based on the classification proportion $p_{t-1}(N|K)$ and the importance $\pi_{t-1}(K)$ which are calculated immediately before, and plural pieces of second pass information $\tau_N^{(II)(d)}$ (S26). The proportion $\gamma_t^{(d)}(K)$ is calculated by the relationship obtained by replacing the first pass information $\tau_n^{(I)(d)}$ in Equation (3) with the second pass information $\tau_N^{(II)(d)}$.

Further, the importance $\pi_t(K)$ of the community [K] of the network is calculated by Equation (4) (S27). Further, whether to end the sequential calculation by the second classification proportion calculation unit 163a and the second importance calculation unit 163b is determined by whether or not the absolute value $|Q_t - Q_{t-1}|$ of a difference in the evaluated values $Q_t$ before and after the sequential calculation is smaller than the predetermined reference values (S28). Here, the evaluated value $Q_t$ is given by the relationship obtained by replacing the matrix $T^{(I)}$ and the first pass information $\tau_n^{(I)(d)}$ in Equation (5) with the matrix $T^{(II)}$ and the second pass information $\tau_N^{(II)(d)}$.

If $|Q_t - Q_{t-1}| < \varepsilon$ is not established, the classification proportion $p_t(N|K)$, the importance $\pi_t(K)$ and the proportion $\gamma_t^{(d)}(K)$, which are the latest, are updated to the classification proportion, the importance, and the proportion which are the previous (S29). Meanwhile, if $|Q_t - Q_{t-1}| < \varepsilon$ is established, the second classification proportion by which the node [N] is classified into the community [K] is determined by $p^{(II)}(N|K) = p_t(N|K)$, and the second importance of the community [K] is determined by the $\pi^{(II)}(K) = \pi_t(K)$ (S30).

Further, with respect to each of the event node and the time node which are included in the node group, the second attribution calculation unit 163c calculates the second attribution $q^{(II)}(K|N)$ so as to have a larger value (S31), as the second classification proportion $p^{(II)}(n|k)$ by which the node [N] is classified into the community [K] becomes larger. The second attribution $q^{(II)}(K|N)$ is given by the relationship obtained by replacing the first classification proportion $p^{(I)}(n|k)$ and the first importance $\pi^{(I)}(k)$ of Equation (6) with the second classification proportion $p^{(II)}(N|K)$ and the second importance $\pi^{(II)}(K)$.

The second community generation unit 163 generates the second communities of one or more of the second network information 110, to which the interest node [N] belongs, based on the second classification proportion $p^{(II)}(N|K)$ relating to the interest node [N], which is calculated so as to have a correlation according to the value a of the resolution 13 (S32). The second community generation unit 163 may determine the proportion of the interest node [N] belonging to the community [K] by the value of the second classification proportion $p^{(II)}(N|K)$. Further, the second community generation unit 163 may generate the second community, to which the interest node [N] belongs, based on the second attribution $q^{(II)}(K|N)$ which is calculated from the second classification proportion $p^{(II)}(N|K)$ and the second importance $\pi^{(II)}(K)$. In this case, the proportion of the interest node [N] belonging to the community [K] is determined by the value of the second attribution $q^{(II)}(K|N)$. Even in any case, the second community generation unit 163 generates the second communities of two or more to which the interest node [N] belongs. Therefore, according to the second community generation unit 163 according to the present embodiment, the community classification representing the case where one node has plural attributes is performed.

The first community generation unit 161 according to the present embodiment again performs the first community generation by using a calculation result of the second community generation unit 163. Specifically, the first classification proportion calculation unit 161a and the first importance calculation unit 161b according to the present embodiment determine $p_0^{(I)}(n|k)$, $\pi_0^{(I)}(k)$, and $\gamma_0^{(I)(d)}(k)$, which are tentative values, by the values of the second classification proportion $p^{(II)}(N|K)$, the second importance $\pi^{(II)}(K)$, and the latest proportion $\gamma_t^{(d)}(K)$ which are calculated by the second classification proportion calculation unit 163a and the second importance calculation unit 163b, again calculate the first classification proportion and the first importance, and again calculate the first attribution. Thus, the first community generation unit 161 and the second community generation unit 163 according to the present embodiment respectively generate the first community and the second community, by alternately performing the sequential calculation using the calculation result of the other party. The number of alternate sequential calculations may be a predetermined number of times. In addition, the degree of the impact of the calculation result of the other party may be adjusted by setting the ratio between the number of repetitions of repeated calculations by the first community generation unit 161 and the number of repetitions of repeated calculations by the second community generation unit 163 to a value co of the link weight 15. Thus, since the first community generation and the second community generation are repeatedly and alternately performed based on the calculation result of the counterpart, the accuracy of the community generation is sequentially improved.

The information processing apparatus 1 according to the present embodiment acquires the first network information 100 including the event link representing the event node involved in the event, and generates the first community by the first community generation unit 161. The second network information 110 including the time link of the number corresponding to the number of occurrences of the event is acquired, and the second community is generated by the second community generation unit 163. The dominant factor for determining the amount of calculation required for the community generation is the number of links included in the network information. Therefore, according to the information processing apparatus 1 according to the present embodiment, the community of the network information of which contents change with time is generated in the amount of calculation in accordance with the number of occurrences of the event.

Figure 8:
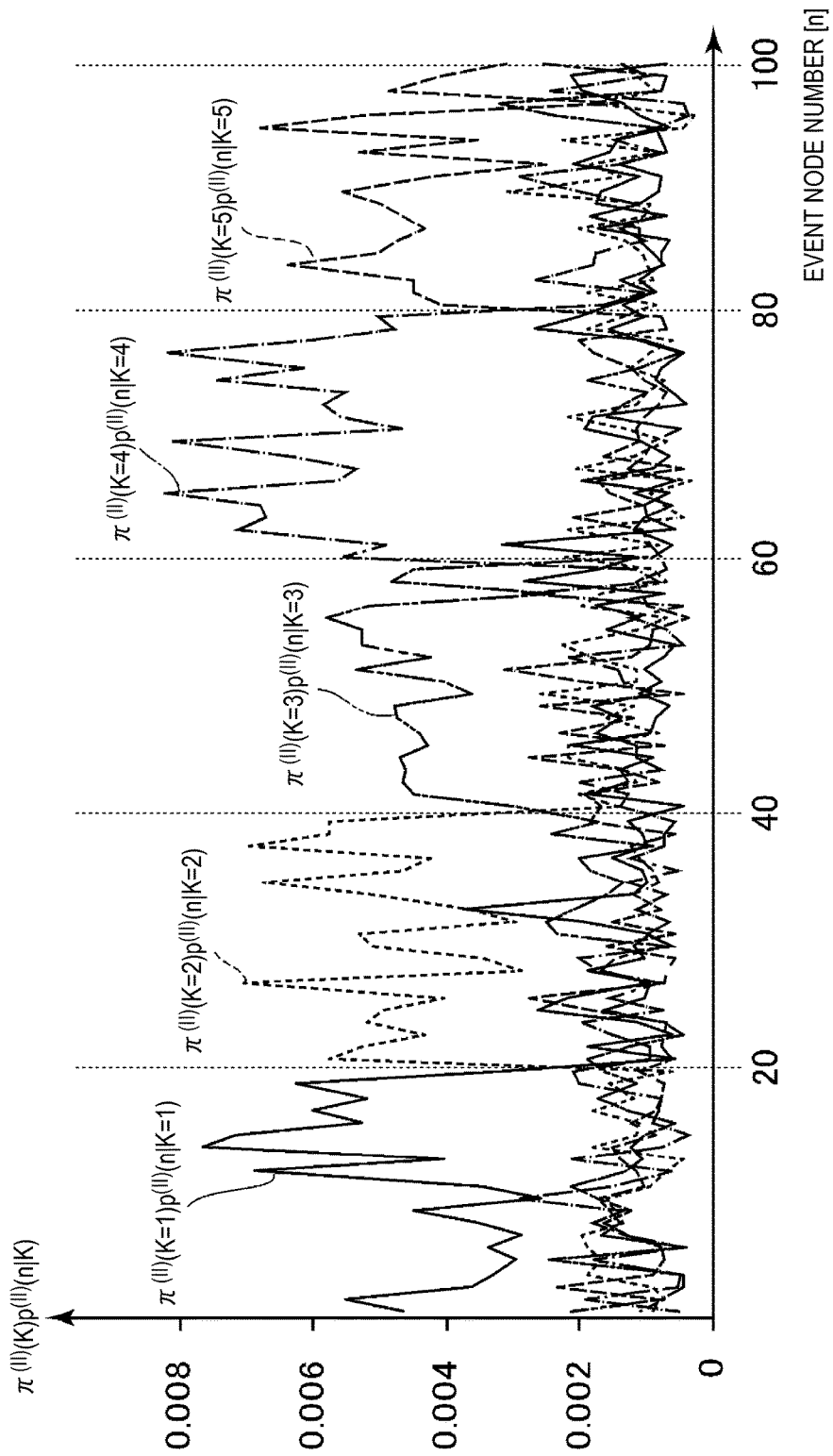
FIG. 8 is a graph illustrating a value of the event node [n], among a product of a second importance and a second classification proportion that are calculated by the information processing apparatus according to the embodiment of the present invention.

FIG. 8 is a graph illustrating a value $\pi^{(II)}(K)p^{(II)}(n|K)$ of the event node [n], among a product of the second importance and the second classification proportion that are calculated by the information processing apparatus 1 according to the embodiment of the present invention. The graph of FIG. 8 illustrates the result of calculation of $\pi^{(II)}(K)p^{(II)}(n|K)$, by alternate calculation for the first network information 100 and the second network information 110 respectively including 100 pieces of event nodes 101. The horizontal axis of the graph represents the event node numbers of n=1 to 100, and the vertical axis represents the value of the product of the second importance and the second classification proportion. The values in the case of K=1 to 5 are plotted in the graph.

If focusing on the values of $\pi^{(II)}(K=1)p^{(II)}(n|K=1)$, the values are relatively large for the event nodes of n=1 to 20, and relatively small for the other event nodes (event nodes of n=21 to 100). If the value of $\pi^{(II)}(K)p^{(II)}(n|K)$ in the case of K=2 to 5 is also taken into account, it is known that with respect to the event nodes of n=1 to 20, the proportion belonging to the community of K=1 is large and the proportion belonging to the community of K=2 to 5 is small. Similarly, it is known that with respect to the event nodes of n=21 to 40, the proportion belonging to the community of K=2 is large, and the proportion belonging to the communities of K=1, 3 to 5 is small. Further, it is known that with respect to the event nodes of n=41 to 60, the proportion belonging to the community of K=3 is large, and the proportion belonging to the communities of K=1, 2, 4, 5 is small. Further, it is known that with respect to the event nodes of n=61 to 80, the proportion belonging to the community of K=4 is large, and the proportion belonging to the communities of K=1 to 3, 5 is small. Further, it is known that with respect to the event nodes of n=81 to 100, the proportion belonging to the community of K=5 is large, and the proportion belonging to the communities of K=2 to 4 is small. It is known that five first communities are generated from these types of information: the community [1-1] including the event nodes of n=1 to 20, the community [1-2] including the event nodes of n=21 to 40, the community [1-3] including the event nodes of n=41 to 60, the community [1-4] including the event nodes of n=61 to 80, and the community [1-5] including the event nodes of n=81 to 100.

However, since the community classification of the event node 101 does not include information indicating a time when the event link 102 is formed, five generated communities may be formed based on the event links 102 formed in temporally different timings. Therefore, if the community is generated only based on the event node 101, there is a case in which the temporal structure of network information is not achieved. In this regard, in the information processing apparatus 1 according to the present embodiment, the temporal structure of network information is achieved by performing the community classification of the time node 111 as well.

Figure 9:
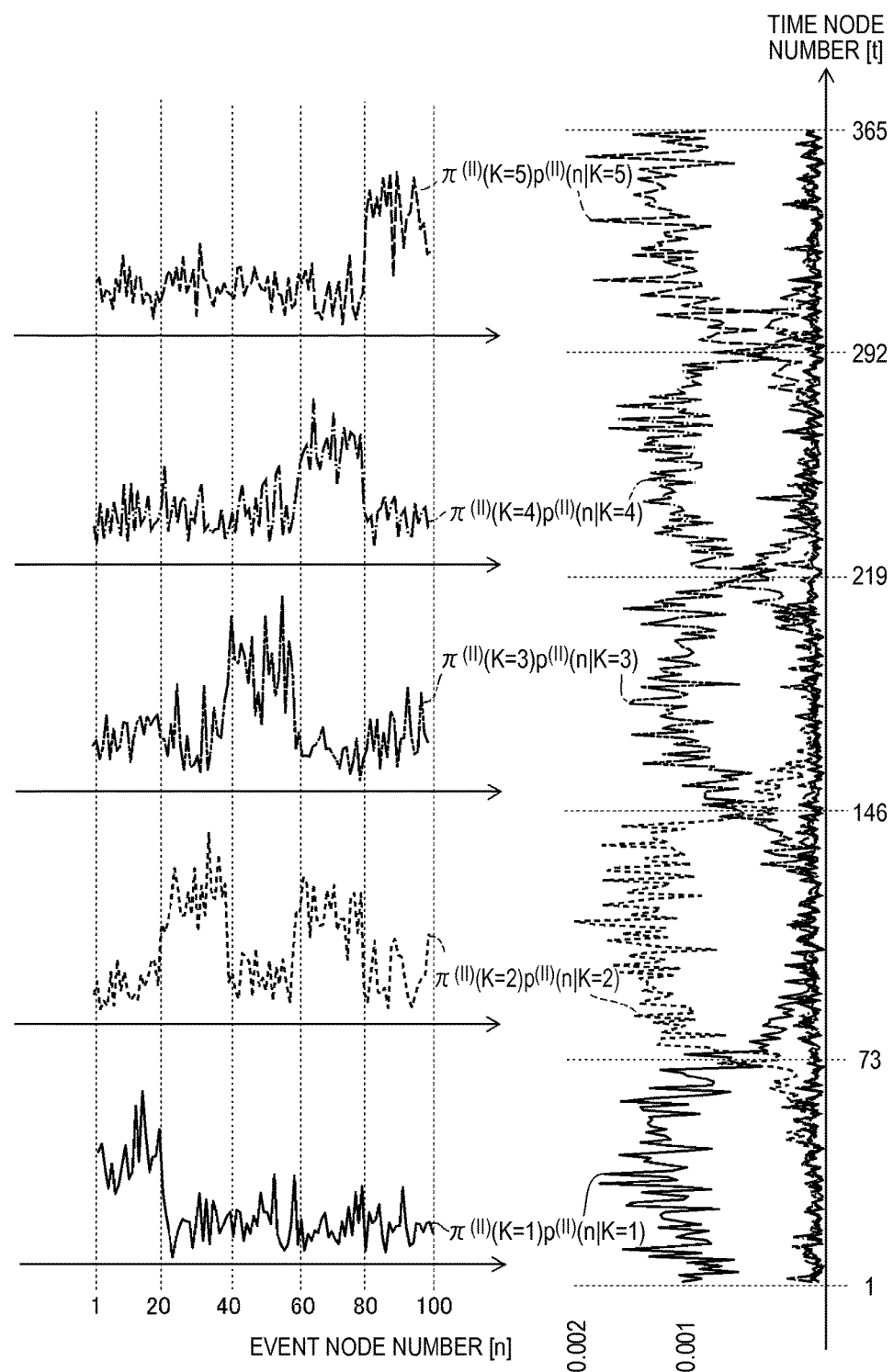
FIG. 9 is a graph illustrating a value of a product of the second importance and the second classification proportion that are calculated by the information processing apparatus according to the embodiment of the present invention.

FIG. 9 is a graph illustrating a value $\pi^{(II)}(K)p^{(II)}(N|K)$ of a product of the second importance and the second classification proportion that are calculated by the information processing apparatus 1 according to the embodiment of the present invention. FIG. 9 illustrates a value $\pi^{(II)}(K)p^{(II)}(N|K)$ of a product of the second importance and the second classification proportion that are calculated by alternate calculation for the first network information 100 and the second network information 110 respectively including 100 event nodes 101. The second network information 110 includes 100 event nodes 101 and 365 time nodes. Here, 365 time nodes are time nodes corresponding to days during one year. The date of the event is recorded in the second network information 110 by connecting the time node indicating the date when an event occurs and the event node with a time link.

Five graphs are illustrated on the left side of FIG. 9, the horizontal axis represents the event node numbers of n=1 to 100, and the vertical axis represents values (values of $\pi^{(II)}(K)p^{(II)}(N|K)$ in the case of N=1 to 100) regarding event nodes, among the values of the product of the second importance and the second classification proportion. Further, the graphs of the values of the product of the second importance and the second classification proportion regarding the time node are illustrated on the right side of FIG. 9, the vertical axis of the graph represents the time node numbers of t=1 to 365, and the horizontal axis represents values (values of $\pi^{(II)}(K)p^{(II)}(N|K)$ in the case of N=101 to 465) regarding time nodes, among the values of the second attribution.

If focusing on the values of $\pi^{(II)}(K=1)p^{(II)}(N|K=1)$, the values are relatively large for the event nodes of n=1 to 20, and relatively small for the other event nodes (event nodes of n=21 to 100). The values are relatively large for the time nodes of t=1 to 73, and relatively small for the other time nodes (time nodes of t=74 to 365). If the values of $\pi^{(II)}(K)p^{(II)}(N|K)$ in the case of K=2 to 4 are taken into account, it is known that with respect to the event nodes of n=1 to 20 and the time nodes of t=1 to 73, the proportion belonging to the community of K=1 is large and the proportion belonging to the community of K=2 to 5 is small. In addition, if focusing on the values of $\pi^{(II)}(K=2)p^{(II)}(N|K=2)$, the values are relatively large for the event nodes of n=21 to 40 and 61 to 80, and relatively small for the other event nodes (event nodes of n=1 to 20, 41 to 60, and 81 to 100). In addition, the values of $\pi^{(II)}(K=2)p^{(II)}(N|K=2)$ are relatively large for the time nodes of t=74 to 146, and relatively small for the other time nodes (time nodes of t=1 to 73, and 147 to 365). It is known that with respect to the event nodes of n=21 to 40 and 61 to 80 and the time nodes of t=74 to 146, the proportion belonging to the community of K=2 is large and the proportion belonging to the community of K=1, 3 to 5 is small. It is known that with respect to the event nodes of n=41 to 60 and the time nodes of t=147 to 219, the proportion belonging to the community of K=3 is large and the proportion belonging to the community of K=1, 2, 4, 5 is small. It is known that with respect to the event nodes of n=61 to 80 and the time nodes of t=220 to 292, the proportion belonging to the community of K=4 is large and the proportion belonging to the community of K=1 to 3, 5 is small. It is known that with respect to the event nodes of n=81 to 100 and the time nodes of t=293 to 365, the proportion belonging to the community of K=5 is large and the proportion belonging to the community of K=1 to 4 is small.

It is known that five second communities are generated from these pieces of information: a community [2-1] including the event nodes of n=1 to 20 and time nodes of t=1 to 73, a community [2-2] including the event nodes of n=21 to 40 and 61 to 80 and time nodes of t=74 to 146, a community [2-3] including the event nodes of n=41 to 60 and time nodes of t=147 to 219, a community [2-4] including the event nodes of n=61 to 80 and time nodes of t=220 to 292, and a community [2-5] including the event nodes of n=81 to 100 and time nodes of t=293 to 365.

Here, the second communities corresponding to $\pi^{(II)}(K=2)p^{(II)}(N|K=2)$ include event nodes of n=21 to 40 and 61 to 80. In other words, it is known that the events occurring at times indicated by the time nodes of t=74 to 146 include two unities: event nodes of n=21 to 40 and event nodes of n=61 to 80.

When the number of first communities belonging to one or more interest nodes is two or more for one or more interest nodes belonging to one second community among plural event nodes 101, the community decomposition unit 163d according to the present embodiment decomposes the second community of 1 into two or more interest nodes according to two or more first communities. Explanation will be given with reference to examples of FIGS. 8 and 9, the event nodes of n=21 to 40 and 61 to 80 which are one or more interest nodes belong to one second community (community [2-2]), and belong to two or more first communities (community [1-2] and community [1-4]). Accordingly, the community decomposition unit 163d decomposes the community [2-2] which is one second community into the community [2-2a] including event nodes of n=21 to 40 and time nodes of t=74 to 146, and the community [2-2b] including event nodes of n=61 to 80 and time nodes of t=74 to 146, according to the community [1-2] and the community [1-4]. Thus, since the second community is decomposed with reference to the first community, even when plural events occur in ranges which temporarily overlap, the community decomposition of an event node is performed and a community is generated.

Figure 10:
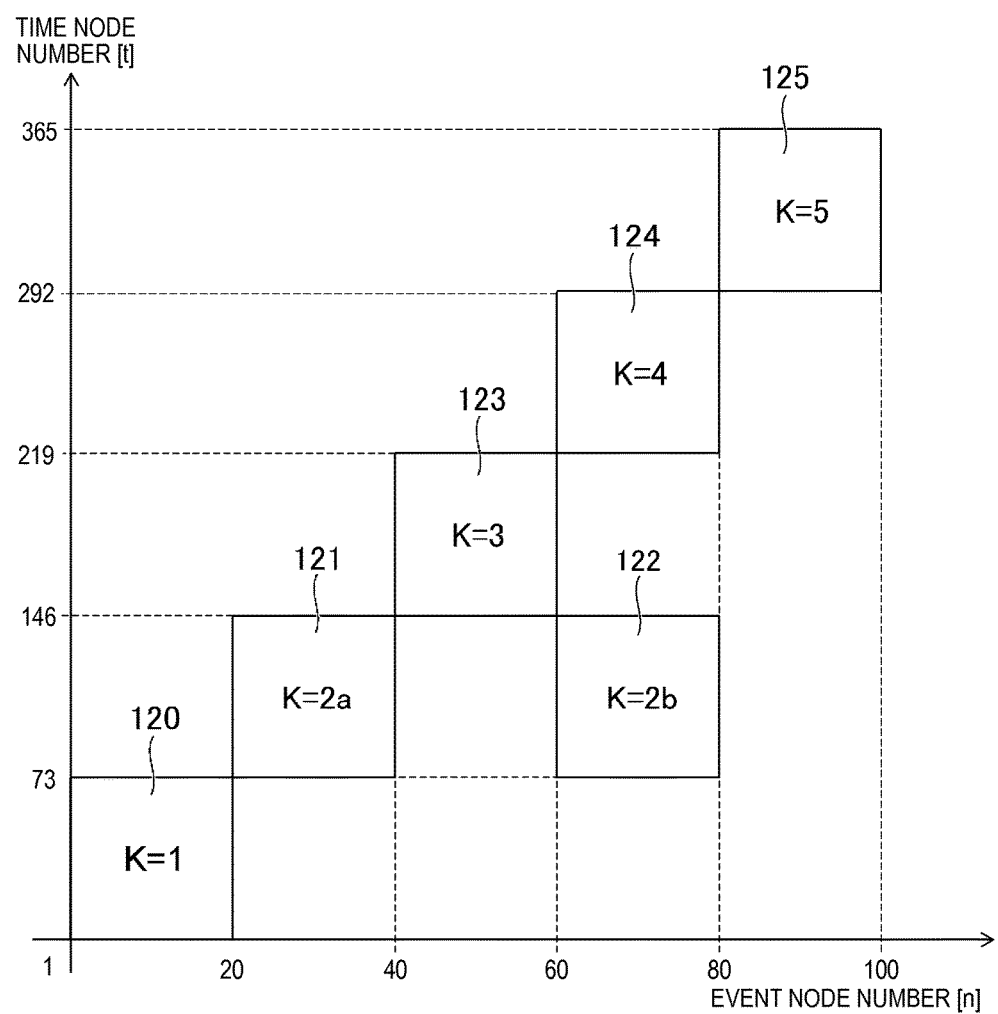
FIG. 10 is a graph illustrating a second community that is decomposed by the information processing apparatus according to the embodiment of the present invention.

FIG. 10 is a graph illustrating a second community that is decomposed by the information processing apparatus 1 according to the present embodiment. In FIG. 10, event node numbers of n=1 to 100 are represented on a horizontal axis, and time node numbers of t=1 to 365 are represented on a vertical axis. A rectangular area marked by "K=1" in the graph represents a community [2-1] 120 including event nodes of n=1 to 20 and time nodes of t=1 to 73. Further, a rectangular area marked by "K=2a" in the graph represents a community [2-2a] 121 including event nodes of n=21 to 40 and time nodes of t=74 to 146. Further, a rectangular area marked by "K=2b" in the graph represents a community [2-2b] 122 including event nodes of n=61 to 80 and time nodes of t=74 to 146. Further, a rectangular area marked by "K=3" in the graph represents a community [2-3] 123 including event nodes of n=41 to 60 and time nodes of t=147 to 219. Further, a rectangular area marked by "K=4" in the graph represents a community [2-4] 124 including event nodes of n=61 to 80 and time nodes of t=220 to 292. Further, a rectangular area marked by "K=5" in the graph represents a community [2-5] 125 including event nodes of n=81 to 100 and time nodes of t=293 to 365.

In FIG. 10, for example, it is known that events occur at two times: a time range indicated by the time nodes of t=74 to 146 and a time range indicated by the time nodes of t=220 to 292, for the event nodes of n=61 to 80. Thus, when different events occur at temporally different timings, a time before-after relationship may not be achieved with respect to the same event node in the first community generation, but the communities having the temporal structure is performed by generating the second communities.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor;
a memory storing a program which causes the processor to perform a process, the process comprising
acquiring first network information including plural event nodes and event links each connecting one pair of event nodes involved in an event, among the plural event nodes;
acquiring second network information including at least two time links each connecting the plural event nodes and plural time nodes, and the one pair of event nodes and the time nodes indicating a time of occurrence of the event, and the second network information including information of a number of the time links corresponding to a number of occurrences of the events, the events being related to two or more of the plural event nodes;
generating one or more first communities to which the plural event nodes belong on the basis of the first network information, using a proportion distribution in a case where there is movement between the plural event nodes along the event link; and
generating one or more second communities to which the plural event nodes and the plural time nodes belong on the basis of the second network information, using a proportion distribution in a case where there is movement between node groups, of which each is configured with the plural event nodes and the plural time nodes, along the time link.

2. The information processing apparatus according to claim 1, the process further comprising:
decomposing the one second community into the two or more first communities for one or more interest nodes to which the one second community belongs, among the plural event nodes, when there is two or more first communities to which the one or more interest node belongs.

3. The information processing apparatus according to claim 1,
wherein the second network information further includes a time correlation link that links the time node indicating the time of occurrence of the event and other time nodes, and has a weight that becomes smaller as the time node is further away from the time of occurrence of the event, and
wherein one or more second communities to which the plural event nodes and the plural time nodes belong are generated using a proportion distribution in a case where there is movement between the node groups along the time link and the time correlation link.

4. The information processing apparatus according to claim 3,
wherein the weight is determined by a correlation including a correlation length parameter indicating a time range having a correlation with the time of occurrence of the event.

5. The information processing apparatus according to claim 1,
wherein the second network information includes time correlation time links of an even number, respectively connecting the one pair of event nodes, and the time node indicating the time of occurrence of the event and a time node indicating a time range having a correlation with the time of occurrence of the event.

6. The information processing apparatus according to claim 1,
wherein the first community and the second community are respectively generated, by alternately performing sequential calculation using a calculation result of a counterpart.

* * * * *